(12) United States Patent
Hasejima et al.

(10) Patent No.: US 9,832,386 B2
(45) Date of Patent: Nov. 28, 2017

(54) EXTERNAL RECOGNITION APPARATUS AND EXCAVATION MACHINE USING EXTERNAL RECOGNITION APPARATUS

(71) Applicant: Hitachi, Ltd., Chiyoda-ku, Tokyo (JP)

(72) Inventors: Noriyasu Hasejima, Tokyo (JP); Shigeru Matsuo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 14/738,167

(22) Filed: Jun. 12, 2015

(65) Prior Publication Data
US 2016/0094806 A1 Mar. 31, 2016

(30) Foreign Application Priority Data
Sep. 26, 2014 (JP) ................. 2014-195984

(51) Int. Cl.
| | |
|---|---|
| *H04N 7/18* | (2006.01) |
| *H04N 13/02* | (2006.01) |
| *H04N 5/232* | (2006.01) |
| *G06K 9/46* | (2006.01) |
| *G06K 9/52* | (2006.01) |
| *E21B 21/06* | (2006.01) |
| *E02F 9/26* | (2006.01) |
| *G01B 11/14* | (2006.01) |
| *H04N 13/00* | (2006.01) |

(52) U.S. Cl.
CPC ......... *H04N 5/23293* (2013.01); *E02F 9/261* (2013.01); *E02F 9/264* (2013.01); *G01B 11/14* (2013.01); *G06K 9/46* (2013.01); *G06K 9/52* (2013.01); *H04N 7/188* (2013.01); *G06K 2009/4666* (2013.01); *H04N 13/0007* (2013.01); *H04N 13/0239* (2013.01); *H04N 2013/0081* (2013.01)

(58) Field of Classification Search
CPC .. H04N 7/18; H04N 13/0203; H04N 5/23193; H04N 2013/0074; E02F 9/26; E02F 9/264; G01B 11/14; G06K 9/46; G06K 9/52; G06K 2009/4666
USPC .............................. 348/46; 37/416
See application file for complete search history.

(56) References Cited

U.S. PATENT DOCUMENTS

| | | | |
|---|---|---|---|
| 6,247,538 B1 | 6/2001 | Takeda et al. | |
| 6,282,477 B1 * | 8/2001 | Gudat ....................... | E02F 9/26 37/348 |

FOREIGN PATENT DOCUMENTS

| | | |
|---|---|---|
| JP | 10-88625 A | 4/1998 |
| JP | 2010-60344 A | 3/2010 |

* cited by examiner

*Primary Examiner* — Hee-Yong Kim
(74) *Attorney, Agent, or Firm* — Crowell & Moring LLP

(57) ABSTRACT

An external recognition apparatus and an excavation machine using the external recognition apparatus, the external recognition apparatus including: a three-dimensional distance measurement device configured to acquire distance information in a three-dimensional space in a predetermined, region which is under a hydraulic shovel and which includes a region to be excavated by the hydraulic shovel; a plane surface estimation unit configured to estimate a plane surface in the predetermined region based on the distance information; and an excavation object region recognition unit configured to recognize the region to be excavated in the predetermined region based on the plane surface and the distance information.

3 Claims, 10 Drawing Sheets

EXTERNAL RECOGNITION APPARATUS AND EXCAVATION MACHINE USING EXTERNAL RECOGNITION APPARATUS

BACKGROUND OF THE INVENTION

1. Field of the Invention

An embodiment of the present invention relates to an external recognition apparatus and an excavation machine using the external recognition apparatus.

2. Description of the Related Art

As an excavation machine such as a hydraulic shovel or a bulldozer, introduction of a machine to perform an excavation operation automatically or a machine to perform an excavation operation by remote control is in progress. In a case of performing automatic excavation, it is necessary to recognize an excavation object. In an automatic excavation machine disclosed in JP-10-88625-A, an excavation position is determined by a measuring instrument to measure a distance to an excavation object and a recognition unit to recognize a three-dimensional shape based on an output from the measuring instrument.

Also, since there is no depth information during remote control, distance information is acquired sensuously according to an individual experience of an operator. It is preferable to acquire distance information without depending on an experience or a level of skill by complementing these with three-dimensional information. In a space information display apparatus disclosed in JP-2010-60344-A, a visual image photographed by a stereo camera and information of a three-dimensional substance are superimposed and displayed, whereby it is possible to perform a display for a user or an operator easily.

SUMMARY OF THE INVENTION

In the above-described JP-10-88625-A, a case where there is a vehicle on a ground and excavation in an upper direction is performed by the vehicle such as a case of using a wheel loader is assumed. Thus, it is difficult to recognize an excavation object in a case of performing excavation on the excavation object. Also, in JP-2010-60344-A, since a three-dimensional substance is recognized according to a command by an operator, it is difficult to recognize a plane surface.

An embodiment of the present invention is to provide an excavation machine which can recognize an excavation substance on a plane surface in a case of performing excavation of the excavation substance on the excavation substance.

For example, an embodiment of the present invention includes the following configurations in view of the forgoing.

An external recognition apparatus including: a three-dimensional distance measurement device configured to acquire distance information in a three-dimensional space in a predetermined region which is under a hydraulic shovel and which includes a region to be excavated by the hydraulic shovel; a plane surface estimation unit configured to estimate a plane surface in the predetermined region based on the distance information; and an excavation object region recognition unit configured to recognize the region to be excavated in the predetermined region based on the plane surface and the distance information.

According to an embodiment of the present invention, it is possible to provide an excavation machine which can recognize an excavation substance on a plane surface in a case of performing excavation of the excavation substance on the excavation substance. A problem, a configuration, and an effect other than what has been described will be disclosed in the following description.

DESCRIPTION OF THE PREFERRED EMBODIMENTS

In the following, an embodiment of the present invention will be described with reference to the drawings. The following description indicates a detail example of contents of an embodiment of the present invention. The embodiment of the present invention is not limited to the description and can be changed or modified by those skilled in the art within the technical spirit and the scope disclosed in the present description. Also, in all drawings for description of the embodiment of the present invention, the same reference sign is assigned to those including an identical function and repeated description thereof may be omitted.

Figure 1:
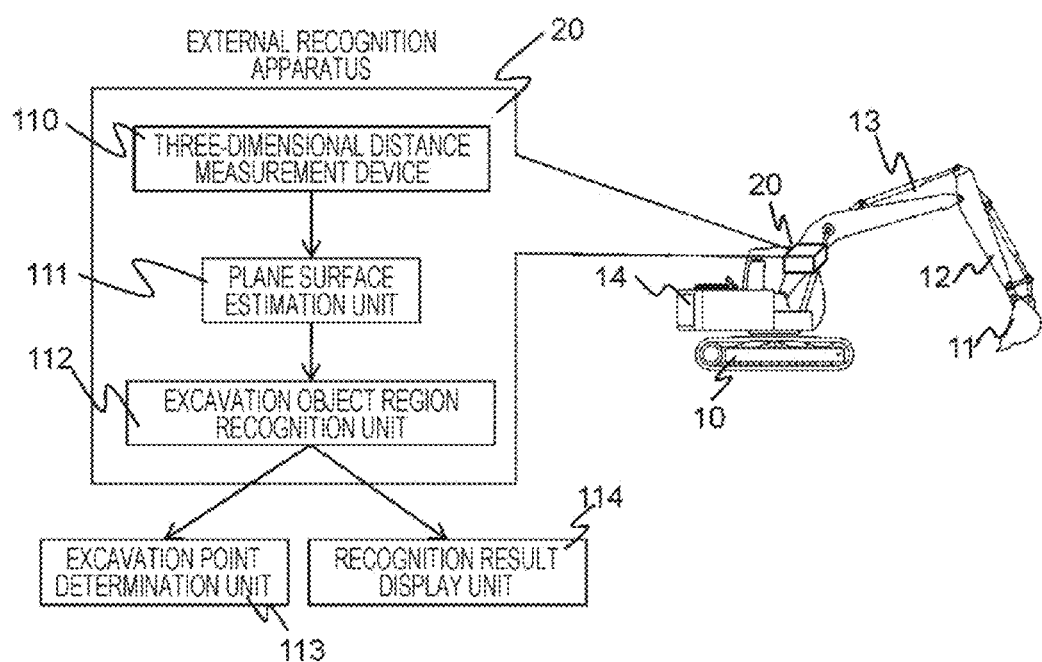
FIG. 1 is a view of an example illustrating a configuration of each of a hydraulic shovel to perform remote control/automatic excavation and an external recognition apparatus mounted to the hydraulic shovel in an embodiment of the present invention.

FIG. 1 is a view illustrating a hydraulic shovel 10 to perform remote control/automatic excavation in an embodiment of the present invention. An excavation machine such as the hydraulic shovel 10 transmits, to an operator, acquired visual information of the surrounding and a recognition result of a region to be excavated during remote control and performs an excavation operation based on input information from the operator. Also, the hydraulic shovel 10 recognizes a region to be excavated during automatic excavation, determines an excavation point based on the recognition result, and performs excavation automatically. Thus, the hydraulic shovel 10 includes an external recognition apparatus 20 to recognize a surrounding environment.

During the remote control, the region to be excavated which region is recognized by the external recognition apparatus 20 is transmitted to the operator while being superimposed on visual information of the surrounding. Also, during the automatic excavation, the region to be excavated which region is recognized by the external recognition apparatus 20 is excavated. The hydraulic shovel 10 includes a bucket 11 to perform excavation and an arm 12 and a boom 13 to move the bucket 11 upward/downward. Also, an upper swing body 14 can be rotated in order to move the bucket 11 to the right/left. Here, the external recognition apparatus 20 includes a three-dimensional distance measurement device 110, a plane surface estimation unit 111, and an excavation object region recognition unit 112.

The external which is specifically a predetermined region which is under the hydraulic shovel 10 and which includes the region to be excavated by the hydraulic shovel 10 is measured by the three-dimensional distance measurement device 110. As an example of the three-dimensional distance measurement device 110, there is a stereo camera, a three-dimensional laser radar, or the like. By using a method described later, the plane surface estimation unit 111 estimates a plane surface far from the hydraulic shovel 10 based on distance information acquired by the three-dimensional distance measurement device 110. Based on the recognition result acquired in the plane surface estimation unit 111 and the distance information acquired in the three-dimensional distance measurement device 110, the excavation object region recognition unit 112 recognizes the region to be excavated by the hydraulic shovel 10 in the predetermined region.

According to she excavation object region recognition unit 112, an excavation point determination unit 113 determines, in the region to be excavated, an excavation point to which the bucket 11 is moved during the control. Note that when performing remote control, the excavation point determination unit 113 can transmit a result thereof to an operator to support the operator.

Based on the result acquired in the excavation object region recognition unit 112, the recognition result display unit 114 displays a plane surface and a region to be excavated. During the remote control, a screen of the monitor is transmitted to the operator to support driving performed by the operator. During the automatic excavation, a display onto a monitor in a cockpit is performed since it is assumed that an operator is in the cockpit even in a case of the automatic excavation.

Figure 2:
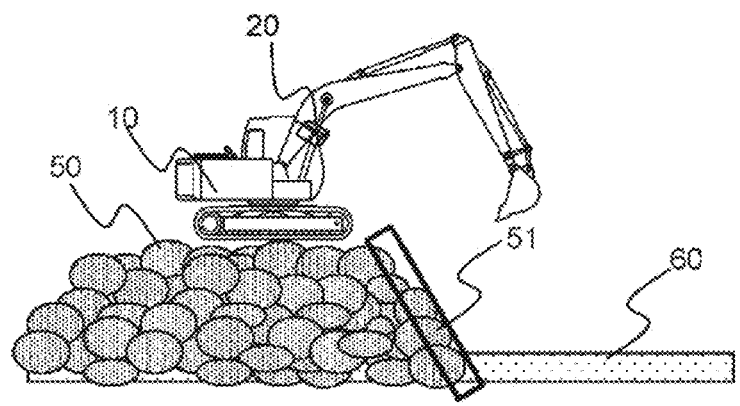
FIG. 2 is a view illustrating an excavation condition of the hydraulic shovel of the embodiment of the present invention.

FIG. 2 is a view illustrating a positional relationship between the hydraulic shovel 10 and an excavation substance 50. The excavation substance 50 is on a ground 60 and the hydraulic shovel 10 is on the excavation substance 50. Here, it is necessary for the hydraulic shovel 10 to recognize a region to be excavated 51. Thus, for measurement of the region to be excavated 51 by the external recognition apparatus 20, it is necessary for the hydraulic shovel 10 to recognize what is under itself. Also, when there is no height information from a region not to be excavated, it is difficult of recognize the region to be excavated.

The three-dimensional distance measurement device 110 also measures a part of the ground 60 in a case of recognizing what is under the hydraulic shovel 10. When the automatic excavation is performed in this situation, an excavation movement is performed with respect to the ground 60 which is a non-excavation region. Thus, it is necessary to recognize only the region to be excavated. Also, since an operation is performed according to a visual image on the monitor in the remote control, it is likely that a depth is lacked. Thus, there is a case where the ground 60 which is a region not to be excavated is excavated. Thus, it is necessary to extract only the region to be excavated and to give presentation to the operator.

Figure 3:
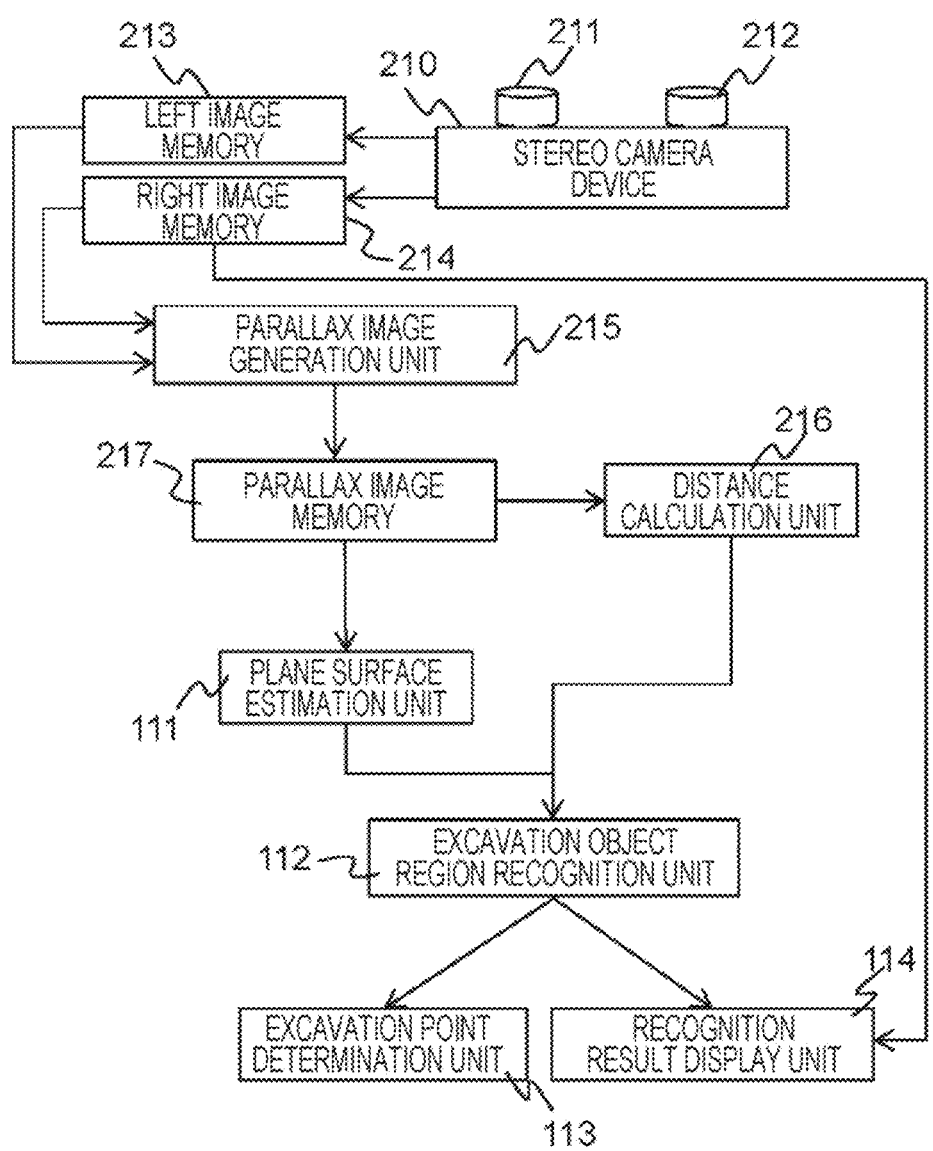
FIG. 3 is a view illustrating a configuration of when a stereo camera device is used as a representative example of a three-dimensional distance measurement device in an embodiment of the present invention.

FIG. 3 is a view illustrating, as a representative example, a configuration of an external recognition apparatus in a case where a stereo camera is used as the three-dimensional distance measurement device 110. A stereo camera device 210 can measure a distance to an object by using a parallax between visual images photographed by two cameras of a left image photographing unit 211 and a right image photographing unit 212. With respect to the images photographed by the stereo camera device 210, an image photographed by the left image photographing unit 211 is temporarily stored into a left image memory 213 and an image photographed by the right image photographing unit 212 is temporarily stored into a right image memory 214.

By using a method described later, the parallax image generation unit 215 creates a parallax image based on data in the left image memory 213 and the right image memory 214. The generated parallax image is stored into a parallax image memory 217. By a principle of triangulation, a distance calculation unit 216 calculates a distance from information of a parallax which information is acquired from the parallax image memory 217. A distance Z can be calculated from a parallax d by the following equation.

$$Z = (f \times B)/d$$

Here, f is a focal length of each of the left image photographing unit 211 and the right image photographing unit 212 and B is a distance between the left image photographing unit 211 and the right image photographing unit 212. Also, three-dimensional positions of X and Y at a point of calculation of Z are calculated by the following equation.

$$X = (Z \times ir)/f$$

$$Y = (Z \times jr)/f$$

However, ir is an x coordinate on the right image stored in the right image memory 214 and jr is a y coordinate on the right image stored in the right image memory 214. As described above, by the images photographed by the stereo camera device 210, positions (X, Y, and Z) of a subject on the three-dimensional space can be calculated.

The plane surface estimation unit 111 acquires the parallax image from the parallax image memory 217 and estimates, by using a method described later, a plane surface in the predetermined region based on a position on the three-dimensional space. By a method described later, the excavation object region recognition unit 112 performs recognition of the region to be excavated from a result from the plane surface estimation unit 111 and the distance information calculated in the distance calculation unit 216. On the recognition result display unit 114, a result recognized in the excavation object region recognition unit 112 and right image information stored in the right image memory 214 are displayed. In the stereo camera device 210, a size of the parallax image stored in the parallax image memory 217 and a size of the right image stored in the right image memory 214 are identical to each other. Thus, it is easy to perform superimposing with respect to the recognition result and to perform an output.

Figure 4:
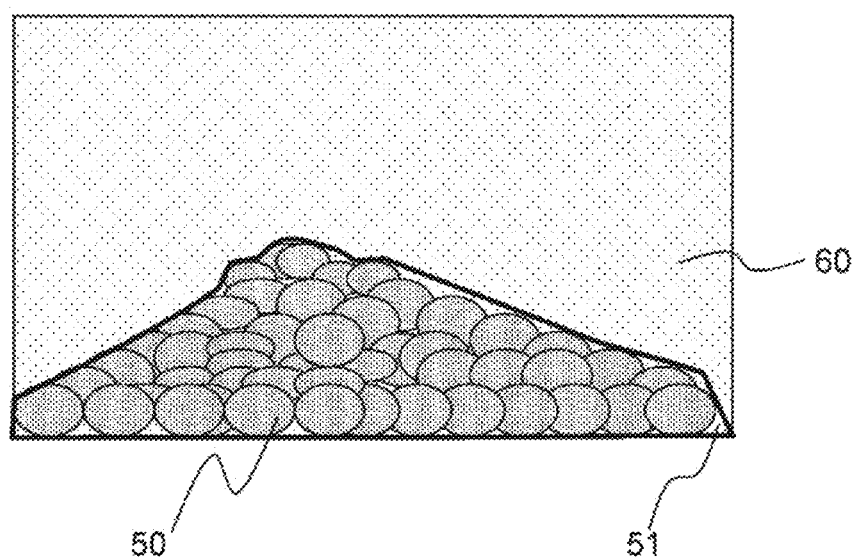
FIG. 4 is an example of a visual image photographed by the stereo camera device.

FIG. 4 is a view illustrating, as a representative example, an example of what is photographed in a positional relationship between the hydraulic shovel 10 and the excavation substance 50 in a case where the stereo camera device 210 is used as the three-dimensional distance measurement device 110. The region to be excavated 51 is photographed in a lower direction of an image and the ground 60 is photographed an upper part thereof.

Figure 5:
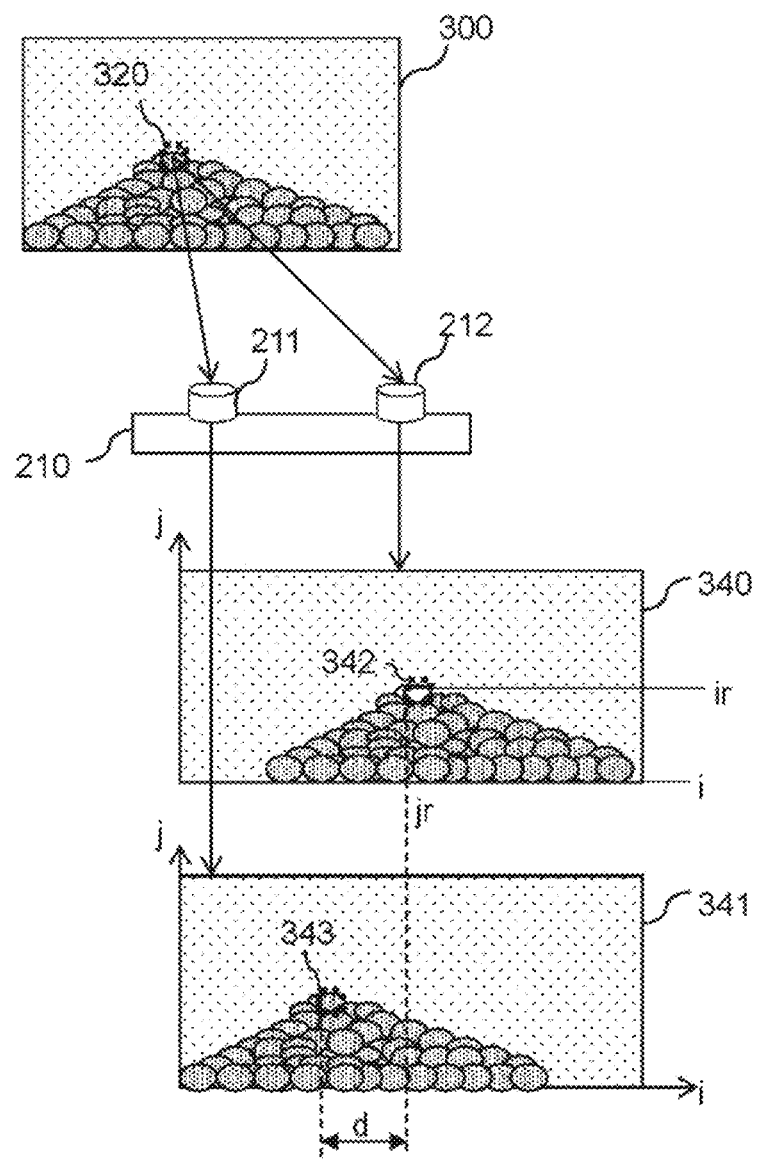
FIG. 5 is a view illustrating a method of parallax calculation by the stereo camera device.

FIG. 5 is a view illustrating a method of calculating a parallax in the stereo camera. By using a right image 340 which is an actually-photographed sight 300 photographed by the right image photographing unit 212 and which is stored in the right image memory 214 and a left image 341 which is photographed by the left image photographing unit 211 and which is stored in the left image memory 213, calculation of a parallax is performed. Here, a point 320 in the actually-photographed sight 300 is photographed at a position of a point 342 in the right image 340 and is photographed at a point 343 in the left image 341. As a result, a difference d is generated between the point 342 and the point 343. The difference d is a parallax. A parallax close to the stereo camera device 210 becomes a large value and that far from the stereo camera device 210 becomes a small value. The parallax calculated by the above-described method is calculated with respect to the whole image in the photographed right image 340. A result of the calculation is stored into the parallax image memory 217.

Figure 6:
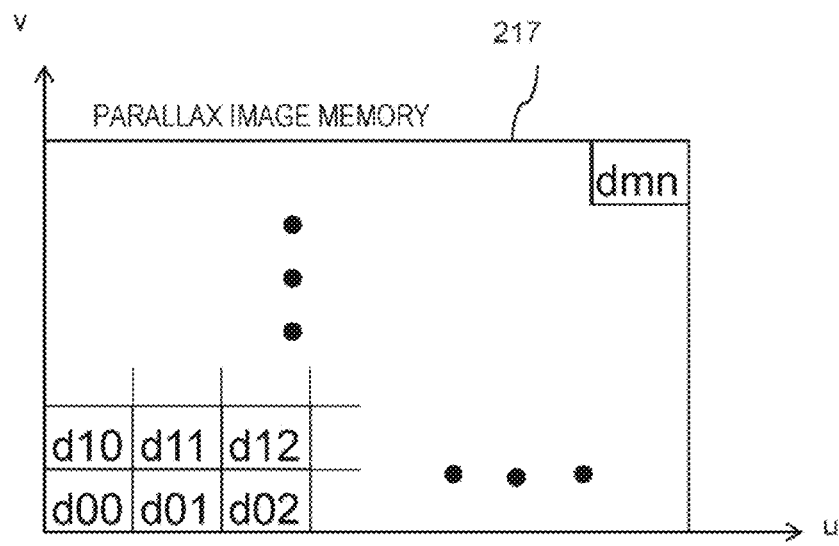
FIG. 6 is a view illustrating an example of a parallax image.

An example of the parallax image memory 217 will be illustrated in FIG. 6. A size of the data stored into the parallax image memory 217 is identical to that of the right image 340. Thus, parallax data can be two-dimensionally arranged in such a manner that she data matches the right image 340. That is, it is possible to associate positions of i and j on the screen, which positions are indicated by the parallax data, with i and j in the right image 340 easily.

Figure 7:
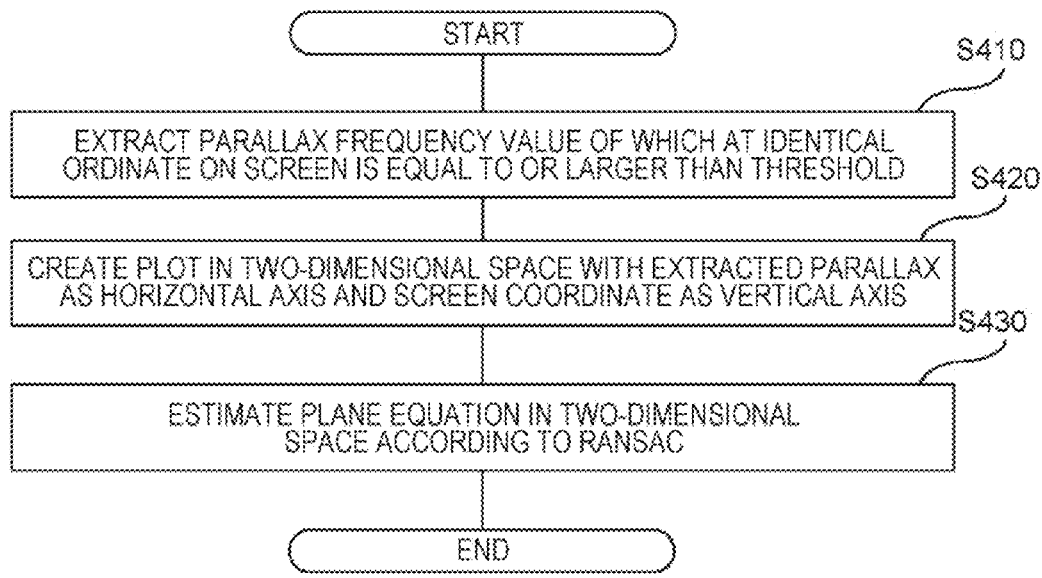
FIG. 7 is a view illustrating a representative plane surface estimation unit by the stereo camera.
Figure 8:
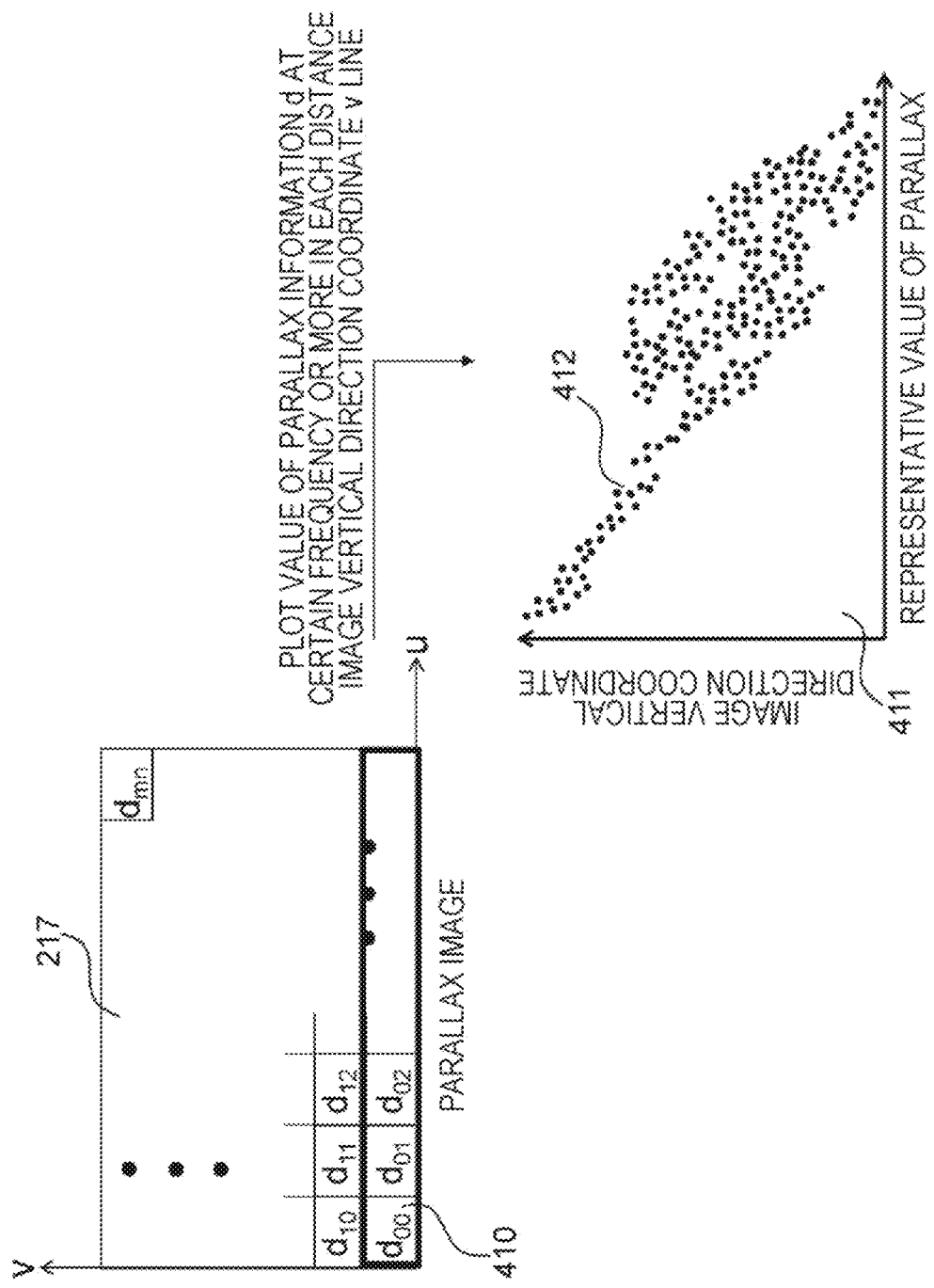
FIG. 8 is a view illustrating a method of the representative plane surface estimation unit by the stereo camera.
Figure 9:
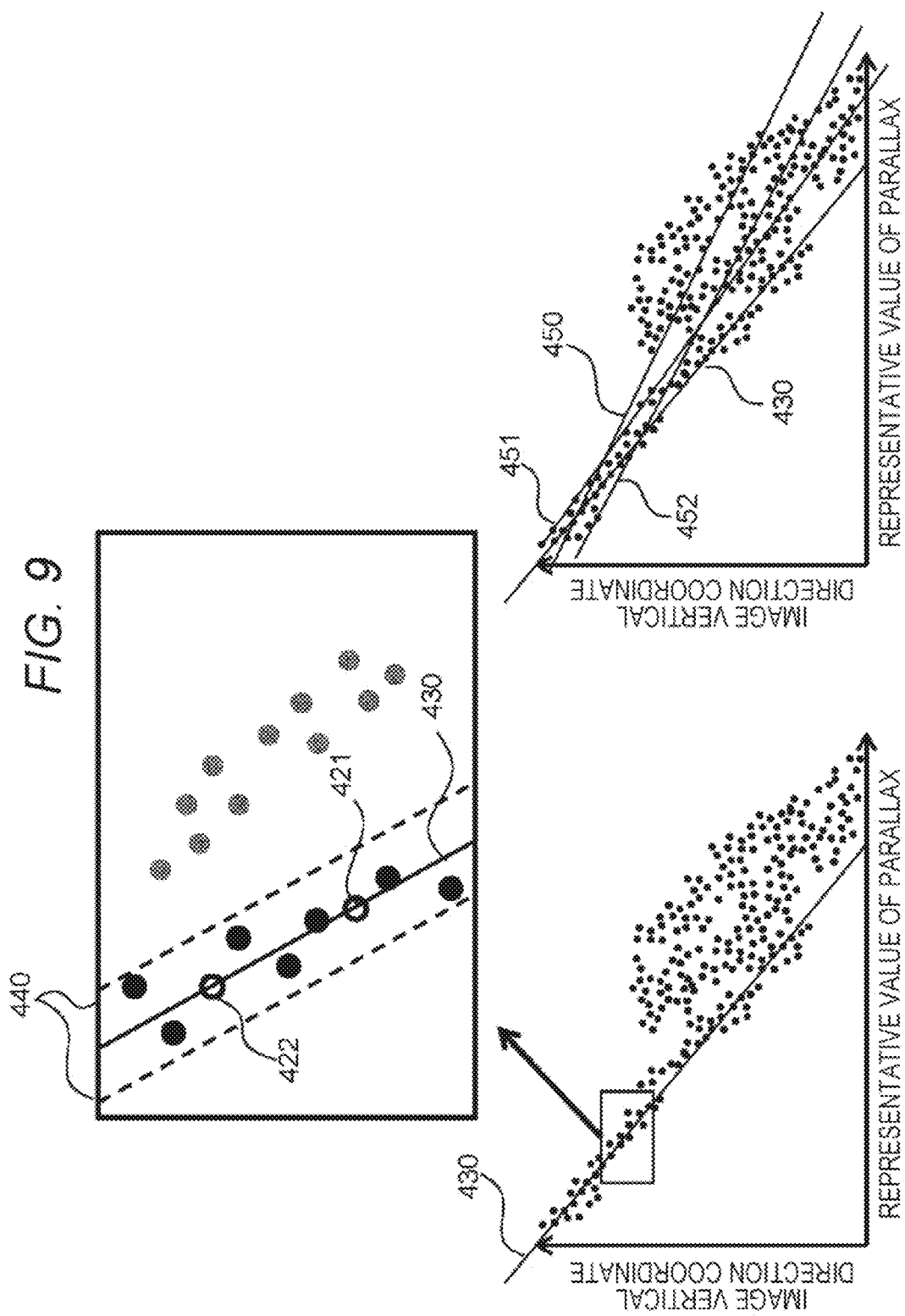
FIG. 9 is a view illustrating performance of plane equation calculation.

FIG. 7 is a view illustrating, as a representative example, a flow of processing in the plane surface estimation unit 111 in a case where a stereo camera is used as the three-dimensional distance measurement device 110. In the parallax image arranged in the parallax image memory 217, a parallax a frequency value of which in an identical ordinate on a screen is equal to or larger than a threshold is extracted (S410). Next, a plot is created in a two-dimensional coordinate space with the extracted parallax as a horizontal axis and a screen coordinate as a vertical axis (3420). An image of processing related to 3410 and S420 is illustrated in FIG. 8 and a detail thereof will be described later. Finally, in the two-dimensional coordinate space, a plane equation in a two-dimensional space is calculated by straight line estimation according to a RANdom SAmple Consensus (RANSAC) method (S430). An image of processing related to S430 is illustrated in FIG. 9 and a detail thereof will be described later. By the above-described processing, estimation of a plane surface is performed. As a method other than the RANSAC method to estimate a plane surface, there is Hough transform or the like. By using the RANSAC method, processing can be performed at high speed and detection of a noise or the like can be performed in a robust manner.

FIG. 8 is a view illustrating a method of the representative plane surface estimation unit by the stereo camera. The parallax image stored in the parallax image memory 217 includes parallax data 410 in each pixel. When it is assumed that a parallax image ordinate is v, a frequency value of the parallax data 410 of each v coordinate sequence is calculated. A parallax equal to or larger than a threshold (hereinafter, referred to as representative point of parallax) is plotted in a two-dimensional coordinate space 411 with the parallax image ordinate v as a vertical axis and a value of the parallax as a horizontal axis. The processing is performed in a whole range of the parallax image stored in the parallax image memory 217 and the two-dimensional coordinate space 411 is generated.

Here, in a case of using a stereo camera, a plot is created by using the information of a parallax in a proportional relationship with the depth information. However, the plot may be created by using the information of a distance. In this case, when it is assumed that a front depth coordinate axis is z and a coordinate axis in a height direction is y with the stereo camera device as an origin, what is similar to the above-described method becomes possible by creating a plot by using z information and y information. Accordingly, although an example of using a stereo camera has been illustrated as a representative example in the present embodiment, it is understood that a different sensor can he also used as a three-dimensional distance measurement device.

FIG. 9 is a view illustrating performance of plane equation calculation. With respect to the two-dimensional coordinate space 411 generated by the above-described method, plane surface estimation is performed by using RANSAC algorithm. In the RANSAC algorithm, two points which are randomly-sampled representative point of a parallax 420 and representative point of a parallax 421 are connected to each other and an equation of a straight line 430 which connects the two points is calculated. By providing a certain acceptable range 440 in parallel with the straight line 430, the number of representative points of a parallax in the range is stored. In the RANSAC algorithm, the above-described processing is performed for a plurality of times. Each of a straight line 450, a straight line 451, and a straight line 452 is an example of a straight line calculated by connecting randomly-selected representative points of a parallax.

Figure 10:
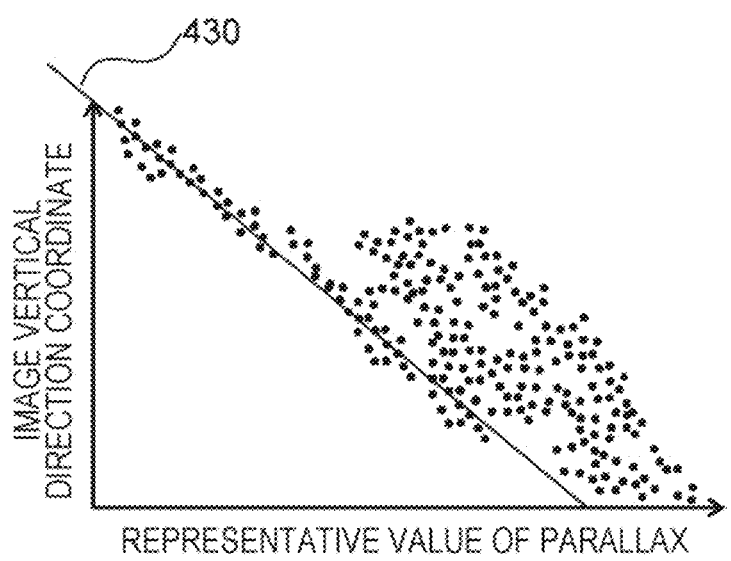
FIG. 10 is a view illustrating a result of using the plane surface estimation unit.

Here, as a constraint condition, the randomly-selected representative point of a parallax 422 is selected in a range in which an image vertical direction coordinate is equal to or larger than a certain threshold since it is understood that there is a region not to be excavated on an upper part of the screen as illustrated in FIG. 4. Also, because of a property of the algorithm, the number of times of implementation is preferably as large as possible within a range of processing time. Among these straight lines, a straight line in which there is the largest number of representative values of a parallax in the acceptable range 440 is defined as a plane surface which is the region not to be excavated. As a result, a result illustrated, for example, in FIG. 10 can be acquired. The straight line 430 is a straight line estimated as a plane surface in the two-dimensional coordinate space 411. In FIG. 10, the straight line 430 descends to the right.

Figure 11:
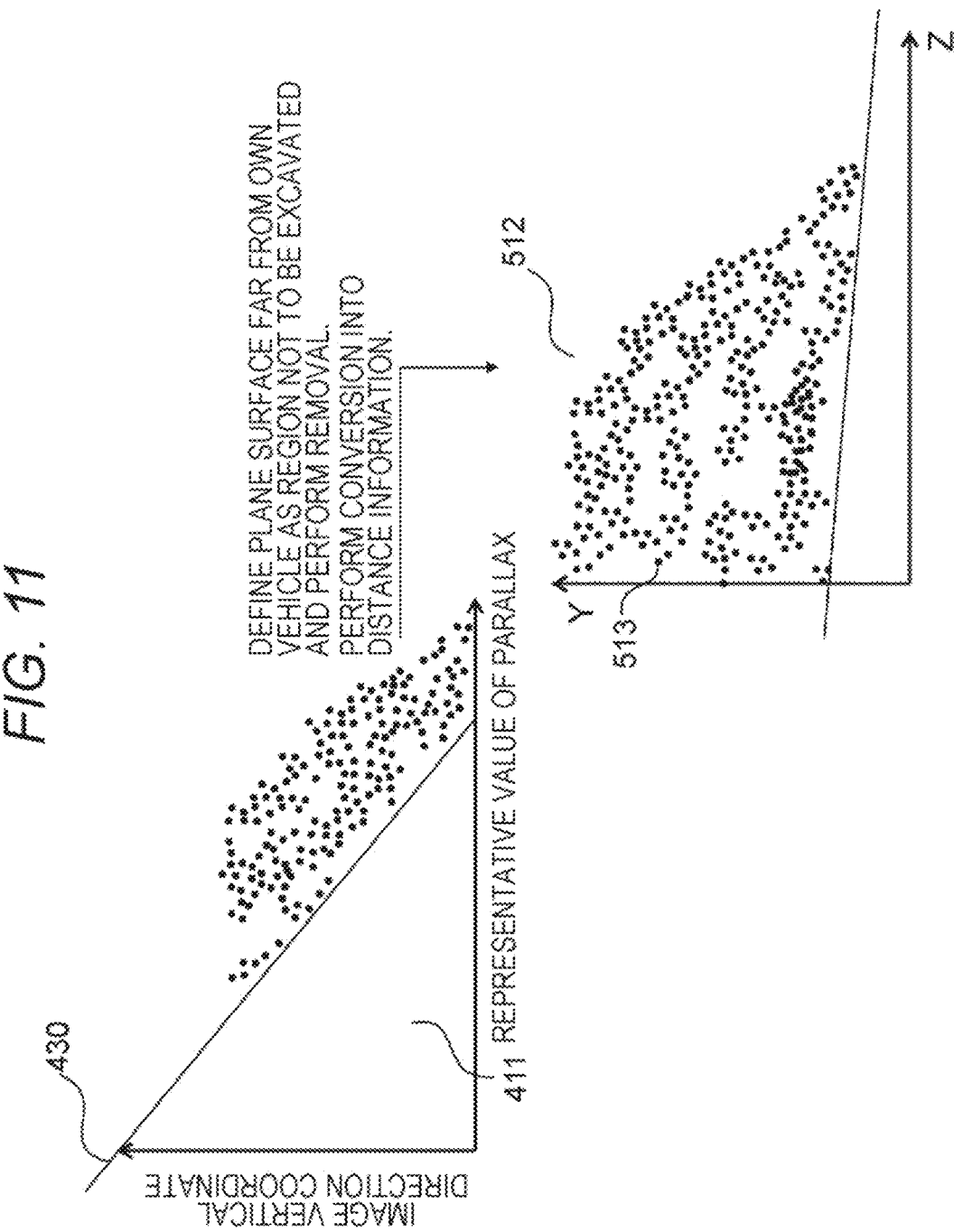
FIG. 11 is a view illustrating a method of extraction a region to be excavated.

FIG. 11 is a view illustrating a method of extracting a region to be excavated. Based on the straight line 430 of the plane surface estimated in the two-dimensional coordinate space 411 by the above-described method, a representative point of a parallax near the plane surface is removed. A representative point of a parallax remains after the removal can be defined as a region to be excavated. Thus, conversion into distance information is performed by the above-described conversion method into a distance.

A two-dimensional space coordinate 512 is the converted distance information indicated in a Y-Z space when a depth direction is a Z coordinate and a vertical direction is a Y coordinate with the stereo camera device 210 as an origin. Here, a point group 513 indicates a position in the region to be excavated of when the stereo camera device 210 is an origin. Based on the information, the excavation point determination unit 113 determines an excavation start point.

Figure 12:
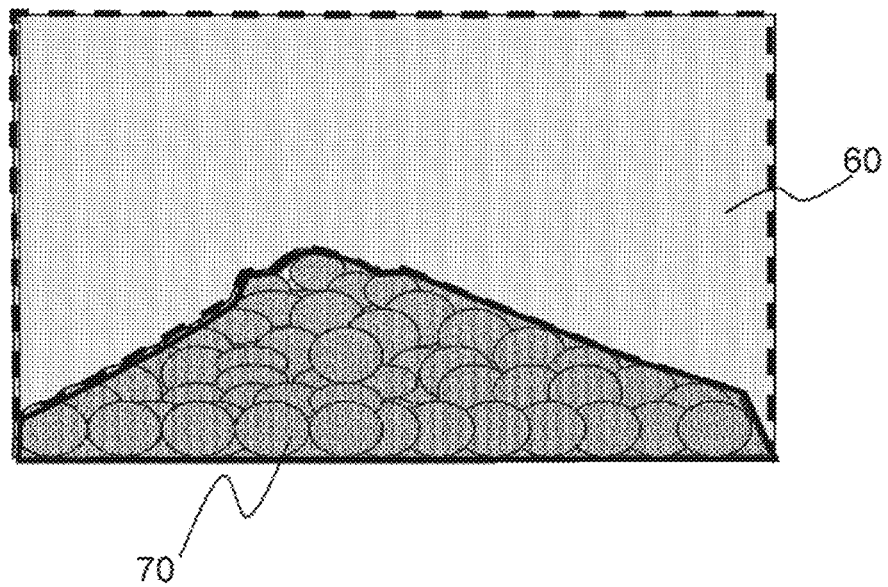
FIG. 12 is a view illustrating a display example of a recognition result.

FIG. 12 is a view illustrating an example of a screen displayed by the recognition result display unit. On the displayed screen, a region to be excavated 70 recognized by the above-described method is colored with respect to the region to be excavated 51, whereby the region to be excavated 51 is presented to the operator. Also, by using an embodiment of the present invention, it is also possible to color the ground 60 which is the region not to be excavated.

By performing visualization in such a manner, it is possible to support an operation by the operator during the remote control. Also, it is assumed that the operator is in a cockpit even din the automatic excavation. Thus, when the region to be excavated is recognized erroneously, it becomes easy to stop the automatic excavation by a stop signal or override by the operator. Here, in the stereo camera disclosed as a representative example in the present embodiment, it is easy to perform superimposing and to perform a display. Also, according to an embodiment of the present invention, it is possible to separate an excavation object and a non-excavation object from each other and to perform a display on a screen during the remote control without an input from the operator. Thus, it is possible to save a trouble of the operator and to improve operation efficiency.

Also, when a three-dimensional laser radar or the like is used as a different three-dimensional distance measurement device, it is further necessary to provide a camera. However, it is considered that a camera is basically provided with respect to the remote control or the automatic excavation, realization thereof is easy. In a case of using a laser radar or the like, a calibration between a provided camera and a device such as a laser radar is necessary.

As described in the above-described present embodiment, the three-dimensional distance measurement device 110, the plane surface estimation unit 111, and the excavation object region recognition unit 112 are included as the external recognition apparatus 20 of the hydraulic shovel 10 which performs remote control or automatic excavation. Thus, it becomes possible to accurately recognize only a region to be excavated. This makes it possible to present a region to be excavated during remote control even when there is no input from the operator and to support an operation. Also, it becomes possible to transmit information only including a region to be excavated to a control-side during automatic excavation.

What is claimed is:

1. An external recognition apparatus comprising:
   a three-dimensional distance measurement device configured to acquire distance information in a three-dimensional space in a predetermined region which is under a hydraulic shovel and which includes a region to be excavated by the hydraulic shovel;
   a plane surface estimation unit configured to estimate a plane surface in the predetermined region based on the distance information; and
   an excavation object region recognition unit configured to recognize the region to be excavated in the predetermined region based on the plane surface and the distance information, wherein
   the plane surface estimation unit estimates the plane surface in the predetermined region by straight line estimation according to a RANSAC method.

2. The external recognition apparatus according to claim 1, further comprising a recognition result display unit configured to separately display the region to be excavated recognized by the excavation object region recognition unit and a non-excavation object in the predetermined region.

3. An excavation machine comprising the external recognition apparatus according to claim 1.

* * * * *